United States Patent [19]

Jasovsky et al.

[11] Patent Number: 4,551,344
[45] Date of Patent: Nov. 5, 1985

[54] METHOD FOR AROMATIZING SOLUBLE COFFEE

[75] Inventors: George A. Jasovsky, Bayonne; Harold W. Jacquett; Gaetano J. de Ceglie, both of Palisades Park, all of N.J.

[73] Assignee: General Foods Corporation, White Plains, N.Y.

[21] Appl. No.: 632,153

[22] Filed: Jul. 18, 1984

Related U.S. Application Data

[63] Continuation-in-part of Ser. No. 481,003, Mar. 31, 1983, abandoned.

[51] Int. Cl.$^4$ .............................................. A23F 5/00
[52] U.S. Cl. .................................... 426/594; 426/386
[58] Field of Search ............... 426/594, 385, 386, 384, 426/388, 417

[56] References Cited

U.S. PATENT DOCUMENTS

| | | | |
|---|---|---|---|
| 3,021,218 | 2/1962 | Clinton et al. | 426/384 |
| 3,535,118 | 10/1970 | Klein et al. | 426/386 |
| 3,939,291 | 2/1976 | Katz | 426/388 |
| 3,979,528 | 9/1976 | Mahlmann | 426/386 |
| 4,007,291 | 2/1977 | Siedlecki et al. | 420/594 |
| 4,119,736 | 10/1978 | Howland et al. | 426/386 |

FOREIGN PATENT DOCUMENTS 1042706 11/1978 Canada .

*Primary Examiner*—Raymond Jones
*Assistant Examiner*—Marianne M. Cintins
*Attorney, Agent, or Firm*—Basam E. Nabulsi; Joseph T. Harcarik; Daniel J. Donovan

[57] ABSTRACT

An improved method for aromatizing soluble coffee is described, whereby a grinder gas frost is concentrated in valuable coffee aromatics by a "rapid vent" from a peak pressure of between about 750 psi and 950 psi to a pressure of between about 300 psi and 375 psi, prior to contacting the grinder gas frost with a glyceride. The aromatized soluble coffee is "buttery," "groundsy" and "less sulfery" in character.

6 Claims, No Drawings

METHOD FOR AROMATIZING SOLUBLE COFFEE

This is a continuation in-part of our prior application, Ser. No. 481,003 filed Mar. 31, 1983, now abandoned.

TECHNICAL FIELD

The invention relates to a method for aromatizing soluble coffee and more particularly to a method for producing an improved aromatized glyceride for use in the aromatization of soluble coffee.

BACKGROUND ART

Grinder gas, that is the gas which is released from roasted whole coffee beans when their internal cell structure is disrupted, such as during grinding of the beans and which also continues to be evolved from the disrupted and/or fractured beans for a short period thereafter, has long been recognized in the art as a highly desirable natural coffee aroma. The collection and stabilization of this aroma has, however, proven to be a difficult undertaking, especially when it is desired for use in a commercial-sized soluble coffee system.

The use of grinder gas as a means to enhance the jar aroma of a soluble coffee powder is disclosed in U.S. Pat. No. 3,021,218 to Clinton et al. which aromatizes the jar headspace and U.S. Pat. No. 2,306,061 to Johnston which condenses grinder gas aromatics onto chilled soluble coffee powder. The use of grinder gas condensates which are added to a liquid extract and dried in order to produce an improved cup aroma when the powder is dissolved in hot water is disclosed in U.S. Pat. No. 3,244,533 to Clinton et al. which homogenizes coffee oil in extract and then adds condensed grinder gas aromatics. Condensed grinder gas frost can be mixed with a liquid glyceride which mixture is then processed to remove excess water, such as by centrifugation, prior to being combined with soluble coffee solids (e.g., soluble powder).

The addition of the condensed aromatics to a glyceride carrier is a known method for stabilizing the aromatics. Such glycerides as coffee oil, bland-tasing vegetables oils and triacetin have proven especially useful for this purpose; however, other oils and low melting point fats may also be used. U.S. Pat. No. 4,119,736 to Howland et al. discloses removal of a water phase from a pressure vessel containing condensed grinder gas at a pressure of in excess of 506.2 psia and a temperature of greater than 32° F., contacting the demoisturized grinder gas with a glyceride, and slowly venting the pressure vessel. Mahlmann in U.S. Pat. No. 3,979,528 discloses a method for aromatizing a glyceride by contacting it with a grinder gas frost in a pressure vessel at various conditions. Among the conditions disclosed by Mahlmann is a rapid pressure release of the pressure vessel to atmospheric pressure at a temperature below room temperature.

It has, however, been desired to maximize the amount of aromatics that are fixed in the glyceride carrier so as to minimize aroma loss and reduce the amount of glyceride which would be incorporated with a soluble coffee product so as to obtain a desired level of aromatization. Moreover, it is desirable to increase the quantity of aromatics generally but especially the aromatics having or imparting a "lighter", "high impact", "groundsy", "buttery", "less sulfury" character to the soluble coffee.

SUMMARY OF THE INVENTION

According to the invention there is provided a much improved method for aromatizing soluble coffee powder with a glyceride aromatized by contact with a grinder gas frost concentrate, comprising the steps of:

(a) condensing, as a frost, grinder gas which has a high carbon dioxide content;

(b) placing the grinder gas frost in a pressure vessel;

(c) supplying heat to the contents of the vessel and allowing the frost to equilibrate at a pressure in excess of 750 psi, thereby forming three phases, a water phase, a liquid carbon dioxide phase and a gaseous carbon dioxide phase;

(d) draining the water phase from the vessel;

(e) venting quickly the gaseous carbon dioxide phase from the vessel until a pressure of about 300 psi to about 375 psi is reached, then resealing the vessel;

(f) introducing a glyceride into the vessel;

(g) supplying heat to the vessel and pressurizing the vessel;

(h) slowly venting the vessel;

(i) obtaining an aromatized glyceride; and (j) combining the aromatized glyceride with soluble coffee powder.

The soluble coffee product is found to have a higher quantity of aromatics generally and especially aromatics having or imparting "lighter", "high impact", "groundsy", "buttery", "less sulfury" character to the soluble coffee.

DETAILED DESCRIPTION OF THE INVENTION

The present invention is directed to combining with coffee solids an aromatized glyceride containing grinder gas aromatics which have been concentrated and condensed from a grinder gas frost. This invention is particularly described in terms of coffee grinder gas, which contans 80% to 90% by weight carbon dioxide; however, it is to be understood that other aroma-bearing gases which have a high carbon dioxide content such as coffee percolator vent gas and coffee roaster gas, may likewise be employed and are considered to be within the scope of this invention.

The most readily available source of grinder gas may be obtained by enclosing or hooding coffee grinding equipment, such as commercial grinders. The gases liberated from the ground coffee may be removed by a pump or rotary blower; additionally, when desired, a stream of inert, preferably moisture free, gas may be used to sweep gas from the coffee and to have the grinding operation take place in a substantially inert atmosphere. Such a process is described in U.S. Pat. No. 2,156,212 which describes a method of collecting gases evolved during roasting, but which can be equally applied to the collection of gases evolved during the grinding or cellular disruption of whole freshly roasted coffee beans. If pumping is employed, it may be desirable to cool the gas ahead of the pump so that the heat added by pumping will not deteriorate the aromatics contained in the gas.

The chemical composition of the evolved gas is largely carbon dioxide together with water vapor and the characteristic aromatic constituents of roasted coffee. The amount of moisture in the gas may be lowered by the use of dry roasting conditions and low-moisture quenches or quenching mediums. The evolved gas is preferably passed through a first condenser where it is cooled to between 35° and 50° F. and where substantial quantities of water are removed. The relatively low-moisture gas is then fed to a condenser, such as a jacketed, vertically-mounted, scraped-wall heat exchanger, which is cooled by means of a liquid gas refrigerant.

Preferably the condenser is cooled by means of liquid nitrogen and the gas flow into the exchanger is maintained within the range of about 1 to 5 cubic feet per minute per square foot of heat exchanger surface. The nitrogen gas that evolves from the cooling system is useful as an inert gas stream which might be used elsewhere in the soluble coffee process, such as sweeping grinder gas from the grinder or inert gas packaging of the soluble coffee product.

The aroma bearing gas is condensed into the form of a frost as it comes into contact with the heat transfer wall of the condenser. Typical grinder gas frost is collected at a liquid nitrogen jacket temperature of −195° F. to −225° F. contains approximately 87% carbon dioxide, approximately 10% water, and approximately 3% coffee aromas. The frost is removed from the condenser wall and collected for combination with a glyceride carrier. The frost may be held for a short period at low, such as liquid nitrogen, temperatures without deteriorating; however, it is preferred to immediately utilize the frost in accordance with this invention.

According to this invention, the grinder gas frost is placed in a pressure vessel. A sufficient amount of the grinder gas frost is added to avoid the presence of an unsaturated carbon dioxide vapor phase. Heat is added to the contents of the vessel, such as by means of a 70° F. to 85° F. water jacket, to sublime the grinder gas frost and form a headspace pressure. At approximately 75 psia solid carbon dioxide changes to liquid. The temperature corresponding to this phase change is −70° F. At this condition, water and any trace glyceride present, as well as some of the organic aromatics, are in the solid state. The temperature of the vessel contents is raised preferably to about room temperature, at which condition the grinder gas aromatics will diffuse and establish an equilibrium among the gaseous carbon dioxide, liquid carbon dioxide, and water phases. Temperatures in excess of about 85° F. should be avoided as degradation of the coffee aromatics may result. After the frost within the vessel has reached the desired temperature, and possibly after an equilibrium period of up to several hours, a peak pressure is reached.

The vessel contents at this peak pressure may be in three distinct phases including a bottom water phase, a liquid carbon dioxide phase, and a gaseous carbon dioxide phase with aroma present in each phase. After the pressure within the vessel has reached its peak, generally at about 750 psia to about 950 psia, the water phase is removed from the vessel. This can be done by simply draining the water through a valve in the bottom of the vessel. The removed water phase may be contacted with a glyceride, preferably coffee oil, in any apparatus that provides efficient liquid-liquid contact to recover aromatics contained therein. However, in a preferred embodiment of the invention, the removed water phase is discarded without being contacted with a glyceride.

The pressure vessel is maintained at a temperature of about 75° F. (23.9° C.) to about 85° F. (29.4° C.) and thereby at a pressure of about 750 psia to about 950 psia, for a period sufficient to ensure the existence of vapor-liquid equilibrium within the pressure vessel. After equilibrium has been established, and possibly after a holdup period of up to several hours, the pressure vessel is rapidly vented to the atmosphere without restriction, until a pressure of between about 300 and 375 psia, and preferably between about 325 and 350 psia, is attained, at which point the pressure vessel is again sealed. It has been discovered according to the invention that the gaseous carbon dioxide stream vented from the pressure vessel during this rapid venting step is very nearly free of grinder gas coffee aromatics. Further, it has been found that the pressure within the pressure vessel rapidly drops from a starting pressure of between about 750 psia and 950 psia to about a pressure of about 300 to 375 psia, at which point the pressure reduction within the pressure vessel ceases briefly despite the restriction-free opening to the atmosphere. Thereafter, if the vessel is allowed to continue to vent freely to the atmosphere, a large amount of grinder gas aromatics are lost in the vented gaseous carbon dioxide stream as the vessel vents from between about 300 and 375 psia to atmospheric pressure.

Generally, the rapid venting step is accomplished as rapidly as is practicable. However, for the proper functioning of the invention, it is important that the pressure vessel be quickly resealable during the brief cessation in pressure reduction which occurs at a pressure of about 300 to 375 psia. Therefore, the pressure vessel is typically rapidly vented by opening a valve in a large diameter pipe, said valve being easily sealable at the point when the pressure reduction briefly ceases. However, automated systems as may become apparent to one skilled in the art which enable a more rapid venting of the pressure vessel and a quick resealing capability are considered to be within the scope of the invention. The period of duration of the rapid vent step depends upon the internal volume of the pressure vessel and the size of the unrestricted vent line. Typically, however, the rapid vent step is less than about one minute in duration, and preferably extends for about 10 to 20 seconds.

The rapid expansion of carbon dioxide gas during the rapid vent step requires a supply of heat. This heat is generally supplied by the inner walls of the pressure vessel, the liquid carbon dioxide phase within the pressure vessel, and the gaseous carbon dioxide phase. As a result, these heat sources are substantially cooled and, in fact, the substantial cooling is accompanied by phase changes, i.e., a fraction of the gaseous carbon dioxide phase is liquified and a percentage of the liquid carbon dioxide phase is solidified. At the point when the pressure reduction briefly ceases, i.e., at a pressure of between about 300 psia and 375 psia, the pressure vessel contains a slushsy, predominantly frozen, mixture of solid and liquid carbon dioxide which is concentrated in grinder gas aromatics. It has been found that this slushy mixture maintains its phase condition, i.e., does not vaporize or sublime to any measurable degree, for a brief interval, until heat begins to re-enter the pressure vessel system from the surrounding environment. It is at this point that the pressure vessel is resealed from the atmosphere according to the invention.

The gaseous carbon dioxide stream which is vented during the rapid venting step has been analyzed for coffee aromatics content by gas chromatography (GC). GC is an analytic technique routinely used to measure the quantity of coffee aromas present in a particular sample. Total GC counts measure the total aromatic content of a sample whereas individual GC "peaks" on a GC printout measure amounts of indiividual compounds in a sample. Comparison of GC peaks is often used to compare the quality of one sample to another. It has been found that the gaseous carbon dioxide stream vented during the rapid vent step measures about $1.0 \times 10^4$ to about $7.0 \times 10^4$ total GC counts. However, if the pressure vessel is thereafter allowed to vent from between about 300 psia and 375 psia to atmospheric pressure, after the brief cessation in pressure reduction, as would be entirely contrary to the teachings of this invention, it has been found that the vented gaseous stream measures on the order of $1.0 \times 10^6$ total GC counts. Therefore, it is clear that the present invention effectively prevents the venting of a gaseous stream very rich in coffee aromatics (50 to 100 times more rich in coffee aromas than the rapidly vented gaseous stream). Further, a comparison by experts of the GC peaks of these two vent streams (peak pressure to brief cessation versus brief cessation to atmospheric pressure) indicates that the aromas potentially lost after the brief cessation by venting to atmospheric pressure are those aromatics which yield a "buttery," "R&G-like" coffee aroma, whereas the rapid vented gaseous stream predominantly carries with it aromatics which contribute to an undesirable "pungent," sulfery" aroma.

Liquid glyceride is pumped into the sealed pressure vessel which contains a slushy, predominantly frozen, mixture of solid and liquid carbon dioxide at a pressure of about 300 psia to about 375 psia. The glyceride is pumped in at a pressure in excess of that within the pressure vessel, preferably about 100 psia greater than that within the pressure vessel. In a preferred embodiment of the invention, coffee oil is used as the glyceride and is atomized into fine droplets as it is introduced into the pressure vessel. The glyceride is generally contacted with the slushy carbon dioxide mixture at a ratio of about 1:1 to 6:1 by weight, typically about 2:1 to 5:1, and preferably about 3:1 to 4:1 glyceride to slushy carbon dioxide.

The pressure vessel is then heated to a temperature about 70° F. to about 85° F., typically by recirculating warm water through the pressure vessel jacketing. This increased temperature results in a new carbon dioxide phase equilibrium being established within the pressure vessel, with some of the solid and liquid carbon dioxide being sublimed and vaporized, thereby increasing the pressure within the vessel. Generally, the increased pressure does not exceed about 500 psia, and typically it is less than about 450 psia. At this point, it may be desirable to drain any residual water from the bottom of the pressure vessel by opening a drain valve.

The transfer of coffee grinder gas aromatics from the carbon dioxide phase to the glyceride phase is accomplished by allowing the two phases to contact within the pressure vessel for a period of about 30 minutes to 1 hour, or longer. Optionally, agitation is employed within the pressure vessel to assist in the transfer of grinder gas coffee aromatics to the glyceride. Thereafter, the pressure vessel is slowly vented to atmospheric pressure, typically over a period of about 2 to about 4 hours. Once atmospheric pressure is attained, the aromatized glyceride of improved quality is removed from the pressure vessel, and is used to aromatize soluble coffee.

The aromatized glyceride may be combined with soluble coffee powder or with coffee extract prior to drying the extract in accordance with any of the known prior art techniques. Typical levels of addition are 0.1 to 2% by weight based on the weight of soluble solids in the final product. The aromatized powder of this invention may consitute all or only a portion of the powder in the final product, as will be apparent to those skilled in the art.

The soluble coffee product is found to have a higher quantity of aromatics generally and especially aromatics having or imparting a "lighter", "high impact", "groundsy", "buttery", "less sulfury" character to the soluble coffee.

The terms "coffee powder" and "coffee extract" used in the description of this invention are meant to include material containing in whole or in part coffee substitutes such as powders or extracts obtained in whole or in part from roasted cereals such as wheat, rye, barley and the like. One such item is the water extract and resulting dried powder of wheat, barley an molasses known as "Instant Postum ®."

EXAMPLE

After the grinders, grinder gas is sent through a water knock-out condenser and demister to reduce moisture content of the gas stream. The grinder gas next enters the battery of liquid nitrogen jacketed, scraped-surface heat exchangers where the gas is condensed and collected as a carbon dioxide "snow" of frost with coffee aromas trapped inside. Grinder gas frost collected at a liquid nitrogen jacket temperature of $-195°$ F. to $-225°$ F. typically contains $\sim 87\%$ carbon dioxide $\sim 10\%$ water, and $\sim 3\%$ coffee aromas.

1. A pressure vessel ("Converter") having an internal volume of $8\frac{1}{2}$ ft$^3$ was loaded with 152 lbs. of grinder gas frost. System was closed and sealed. Jacket temperature was kept at 75° F.

2. Peak pressure of 850–900 psig was reached in 3–4 hours. The following three phase system was formed at peak pressure:
   Phase I—CO$_2$ vapor plus coffee aromatics
   Phase II—CO$_2$ liquid plus coffee aromatics
   Phase III—Liquid H$_2$O plus coffee aromatics
   Phase III was drained and discarded after system was held at peak pressure for 30 minutes.

3. The vessel was vented through a $\frac{1}{2}"$ diameter vent line. The system was allowed to vent rapidly for approximately 30 seconds until the pressure is reduced to 350 psig. The sudden drop in pressure recondensed the aromatics and a small quantity of the carbon dioxide inside the converter into a "concentrated frost." Approximately 20% of the initial charge of grinder gas frost was recondensed as concentrated frost; however, almost 95% of the aromatics originally present were captured along with the recondensed carbon dioxide frost.

4. When the system pressure was 350 psig a brief cessation in pressure drop occurred and the vent valve was closed.

5. Next, 95 lbs. of coffee oil was injected using a high pressure pump.

6. The circulating water was pumped through the jacket of the converter and the system was again brought to 75° F. A peak pressure of approximately 480 psig was reached which was too low for liquid carbon dioxide to exist at 75° F. A two-phase system now existed consisting of gaseous carbon dioxide (with some coffee aromas) in the headspace and aromatized coffee oil.

7. After one hour, carbon dioxide (along with some aromatics) was vented from the system through a capillary vent. The vent rate was designed to minimize oil foaming. Total venting time was 4 hours. Aromatized oil from the converter was drained, filtered, standardized and stored in cans for subsequent use on a soluble coffee packing line.

Gas Chromatographic (GC) data for oil aromatization runs made using the process was obtained. The aromatized coffee oil of the invention measured $6.0 \times 10^6$ counts whereas a standard process can be from 4.5 to $5.0 \times 10^6$ counts.

The aromatized oil is combined with soluble coffee powder at a level of from 0.1% by weight. According to expert evaluations, jar aroma from the process of the present invention lacks the pungent sulfury character associated with a conventional process jar aroma. In addition, there is an overall quality improvement as contrasted with a product made by a conventional process and, specifically, a "lighter", "high impact", "groundsy", "buttery", "less sulfury" character in the final soluble coffee product as determined by panels of expert tasters.

We claim:

1. A method for aromatizing soluble coffee comprising the steps of:
   (a) condensing, as a frost, grinder gas which has a high carbon dioxide content;
   (b) placing the grinder gas frost in a pressure vessel;
   (c) supplying heat to the contents of the vessel and allowing the frost to equilibrate at a pressure in excess of 750 psi, thereby forming three phases, a water phase, a liquid carbon dioxide phase, and a gaseous carbon dioxide phase:
   (d) draining the water phase from the vessel;
   (e) venting quickly the gaseous carbon dioxide phase from the vessel until a pressure of about 300 psi to about 375 psi is reached, then resealing the vessel;
   (f) introducing a glyceride into the vessel;
   (g) supplying heat to the vessel and pressurizing the vessel;
   (h) slowly venting the vessel;
   (i) obtaining an aromatized glyceride; and
   (j) combining the aromatized glyceride with soluble coffee powder.

2. The method of claim 1 in which venting quickly of step (e) takes place in less than about one minute.

3. The method of claim 2, wherein the grinder gas is condensed in a jacketed, vertically-mounted, scraped-wall heat exchanger.

4. The method of claim 3, wherein the grinder gas is passed through a condenser where water is removed, prior to being passed into the scraped-wall heat exchanger.

5. The method of claim 1, wherein heat is supplied to the pressure vessel steps (c) and (g) by means of a water bath at 70° F. to 85° F.

6. The method of claim 1, wherein the aromatized glyceride is combined with soluble coffee powder in an amount of from 0.1 to 0.4% by weight.

* * * * *